Feb. 4, 1969
C. R. MITCHELL
3,425,387
DISGUISED SCALE MEANS FOR APPROXIMATING
THE HEIGHT OF A HOLD-UP MAN
Filed Aug. 28, 1967
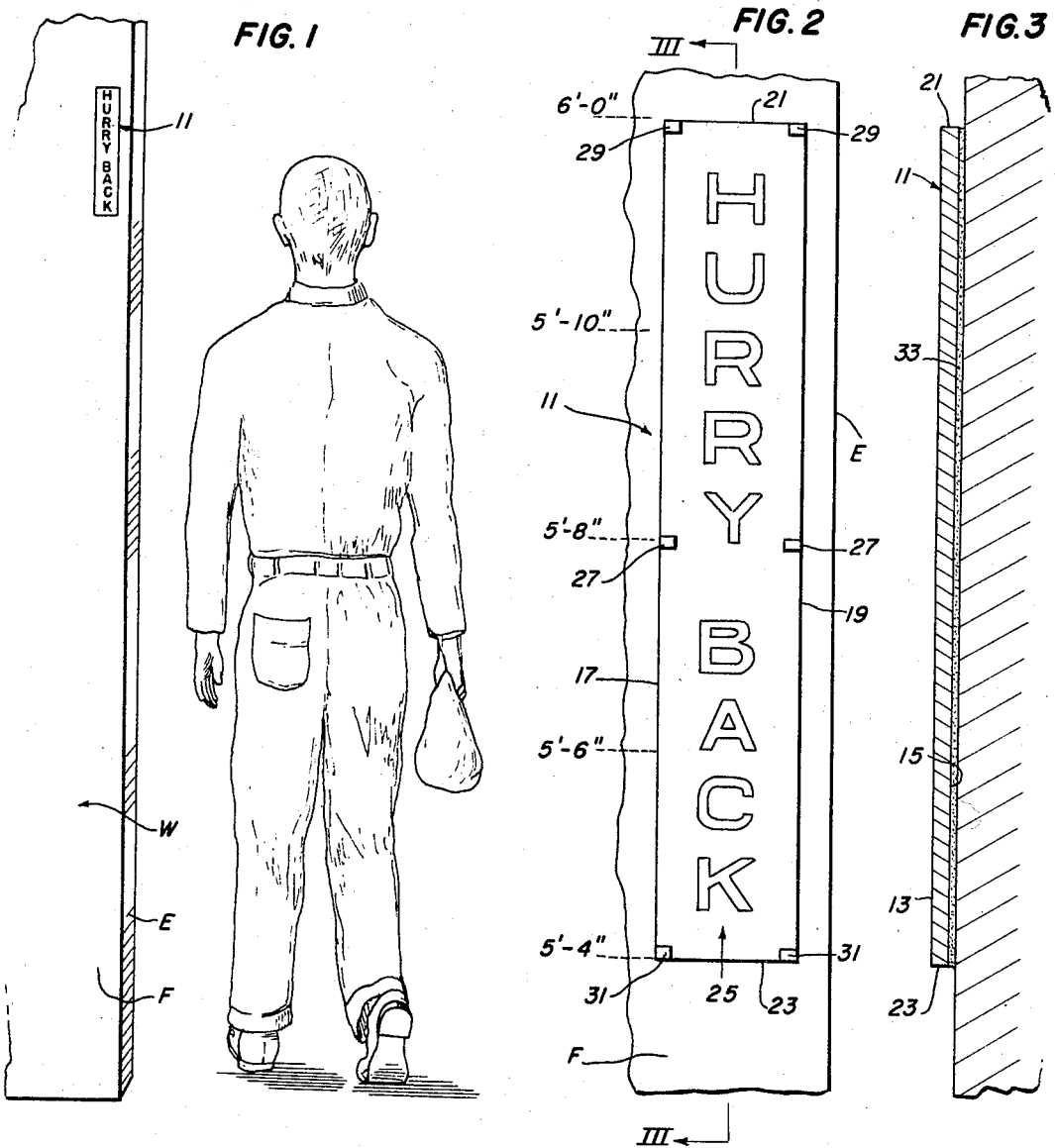
INVENTOR.
CHARLES R. MITCHELL
BY John R. Walker, III
Attorney

United States Patent Office 3,425,387
Patented Feb. 4, 1969

3,425,387
DISGUISED SCALE MEANS FOR APPROXIMATING THE HEIGHT OF A HOLD-UP MAN
Charles R. Mitchell, 4814 Parkside Ave.,
Memphis, Tenn. 38117
Filed Aug. 28, 1967, Ser. No. 663,698
U.S. Cl. 116—114     2 Claims
Int. Cl. G01d 21/00

ABSTRACT OF THE DISCLOSURE

A small, thin, flat, narrow, short base adapted to be secured vertically flat against a wall surface in a bank or other commercial building. The base having a word or phrase formed on the front surface thereof with the alphabetical characters of the word or phrase being arranged vertically and further with the base having two or more vertically aligned marks spaced apart along the longitudinal extension of the base and spaced apart in inches: The base being useful for providing a disguised scale means for approximately the height of a robber as he walks by the base.

BACKGROUND OF THE INVENTION

Apparatus for the identification and apprehension of robbers, hold-up men, or other such lawbreakers.

SUMMARY OF THE INVENTION

The invention comprises the concept of providing a word or phrase of a common meaning and vertically arranged inch markings on a wall or other such structure in a bank or other commercial building. The letters or alphabetical characters of the word or phrase are arranged vertically and arranged on the wall at a height corresponding to the height of an average size person. A worker in the building may readily approximate the height of the robber as he walks by the word or phrase by comparing and remembering the height of the robber relative to a particular letter or inch marking on the wall. It will be understood that the inch markings may be omitted without departing from the spirit and scope of the present invention.

BRIEF DESCRIPTION OF THE DRAWING

FIG. 1 is an environmental perspective view of the scale means of the present invention and illustrated as in use in approximately the height of a robber.

FIG. 2 is an elevational view of the indicia-bearing base of the invention, shown substantially full scale, and illustrated as being secured on a wall surface.

FIG. 3 is a vertical plane sectional view taken as on the line III—III of FIG. 2.

DESCRIPTION OF THE PREFERRED EMBODIMENT

Referring now to the drawings, the scale means of the present invention will be described in conjunction with a wall W having a face surface F and an edge surface E.

The scale means of the invention principally includes a base 11 formed of suitable rigid plastic, metal, wood material, or the like. Base 11 is substantially thin, flat and strip-like and includes respectively front and back surfaces 13, 15; left and right edge surfaces 17, 19; and top and bottom edge surfaces 21, 23. Indicia is formed on front surface 13 and includes a word or phrase conveying a common or appropriate message such as "hurry back" as shown in the drawings. The phrase "hurry back" is indicated by numeral 25.

The alphabetical characters of the phrase 25 are arranged in vertical alignment and are intermittently spaced along the longitudinal extension of base 11. The size and spacing of the alphabetical characters of phrase 25 and also the longitudinal or vertical extension of base 11 preferably are disposed according to the inch system of measurement. A preferred length of base 11, as shown in the drawings, is 8″ between top end edge 21 and bottom end edge 23. The spacing between the word "hurry" and "back" is prominently apparent and arranged approximately at the longitudinal medial portion of base 11.

The indicia formed on front surface 13 of base 11 includes other vertically arranged indicia in the form of pairs of small marks 27, 29 and 31 arranged respectively on the medial, upper and lower portions of base 11. Upper and lower pairs of marks 29, 31 respectively are arranged at the respective corners of base 13 and along the respective top and bottom end edges 21, 23. The pair of medial marks 27 are arranged respectively along the left and right edge surfaces 17, 19 and at the mid-portion of base 11. Marks 27, 29, 31 are arranged respectively along the opposite sides of phrase 25. More or less than three vertically aligned marks (as illustrated in the drawings and described above) may be formed on front surface 13 of base 11 without departing from the spirit and scope of the invention. Marks 27, 29, 31 serve as inch reference points for installing base 11 on wall surface F and for reference points in determining the height of a robber. In FIG. 2 the height indications 5′4″, 5′8″ and 6′0″, indicate a preferred placement of base 11 on wall surface S. In addition, the top of the upper one of the "r's" in "hurry" preferably corresponds to 5′10″ and the bottom of the "a" in "back" preferably corresponds to 5′6″, although other arrangements may be provided without departing from the spirit and scope of the present invention. Also, if desired, the marks 27, 29, and 31 may be omitted with the letters serving only as the indicia, or alternatively the upper and lower edges of the base may serve as indicia along with the letters.

Base 11 is preferably provided with a coating 33 of contact type adhesive. The base is adapted to be secured on wall face F with the adhesive means bonding back surface 15 and wall surface F together.

Now, while I have shown and described an exemplary embodiment of the present invention, it will be understood that various modifications and rearrangements of components and elements of structure may be made without departing from the scope of the invention as defined in the attendant claims.

I claim:
1. A camouflaged height indicator for use in a commercial building commonly serving as a place for business transactions involving currency, including a wall structure defining a vertical flat surface terminating in a vertical edge, said vertical flat surface being arranged generally perpendicularly relative to a corridor, a disguised reference means for approximating a person's height comprising a thin, flat, elongated narrow base member adapted to be mounted vertically on said flat surface and including a front surface, first indicia formed on said front surface constituting an intelligible message and with the alphabetical characters of said message being arranged in vertical alignment spaced along the extent of said base member, second indicia formed on said front surface of said base member including at least one reference mark arranged adjacent to said first indicia, and means adapting said base for attachment to said flat surface contiguous with said vertical edge whereby said first and second indicia are plainly visible, said base member being further adapted to be secured on said flat surface adjacent said vertical edge with the center of said base member being arranged at a height approximately the height of an average size person; thus providing a disguised reference means for approximately the height of an individual.

2. The structure of claim 1 wherein said means adapting said base for attachment to said flat surface includes contact type adhesive.

References Cited

UNITED STATES PATENTS

| 865,709 | 9/1907 | Johnson | 33—169 |
| 2,197,031 | 4/1940 | Davis | 33—169 XR |
| 2,369,988 | 2/1945 | Steckler | 35—1 |
| 3,313,030 | 4/1967 | Heys | 33—169 |

LOUIS J. CAPOZI, *Primary Examiner.*

U.S. Cl. X.R.

33—169